United States Patent
Weems et al.

(10) Patent No.: US 10,914,421 B2
(45) Date of Patent: Feb. 9, 2021

(54) PUSH-BUTTON GREASE GUN BARREL AND METHOD OF USE

(71) Applicant: Weems Industries, Inc., Marion, IA (US)

(72) Inventors: R. Mark Weems, Cedar Rapids, IA (US); Marco Laubach, Marion, IA (US); Allen L. Hudson, Martelle, IA (US); Philip M. Anthony, III, Chicago, IL (US)

(73) Assignee: Weems Industries, Inc., Marion, IA (US)

( * ) Notice: Subject to any disclaimer, the term of this patent is extended or adjusted under 35 U.S.C. 154(b) by 0 days.

(21) Appl. No.: 15/725,108

(22) Filed: Oct. 4, 2017

(65) Prior Publication Data
US 2019/0101241 A1    Apr. 4, 2019

(51) Int. Cl.
*F16N 3/12*    (2006.01)
*F16B 23/00*    (2006.01)
*B65D 83/00*    (2006.01)

(52) U.S. Cl.
CPC .......... *F16N 3/12* (2013.01); *B65D 83/0005* (2013.01); *F16B 23/0007* (2013.01)

(58) Field of Classification Search
CPC .... F16N 3/12; B65D 83/0005; F16B 23/0007
USPC ....................................................... 222/325
See application file for complete search history.

(56) References Cited

U.S. PATENT DOCUMENTS

| | | | |
|---|---|---|---|
| 1,757,736 A * | 5/1930 | Pritchard .................. | F16N 3/12 184/28 |
| 7,985,068 B2 * | 7/2011 | Burdsall ............... | F16L 37/088 285/12 |
| 2010/0116850 A1 * | 5/2010 | Weems ..................... | F16N 3/12 222/256 |
| 2013/0087583 A1 * | 4/2013 | Thorson .................... | F16N 3/12 222/262 |
| 2015/0233524 A1 * | 8/2015 | Kuo ........................ | F16N 19/00 222/386 |

* cited by examiner

*Primary Examiner* — Jeremy Carroll
(74) *Attorney, Agent, or Firm* — Brick Gentry PC; Brian J. Laurenzo; Jessica L. Susie (57) ABSTRACT

A grease gun is provided comprising a body having a reservoir bore with a plurality of grooves; a grease reservoir is in communication with the reservoir bore and has a reservoir groove on an outside surface of the reservoir. A retention fastener is received by a groove and is in operational engagement with the reservoir groove to removably retain the reservoir. The retention fastener may be connected to a fastener bracket via an aperture. The bracket is connected to a push-button via a connection mechanism. The grease reservoir may be removed or mounted to the connection aperture by exerting force on the button which transfers the force to the bracket via the connection mechanism. The force causes movement of the bracket along the aperture which deforms the retention fastener to allow the grease reservoir to be mounted/removed.

15 Claims, 7 Drawing Sheets

PUSH-BUTTON GREASE GUN BARREL AND METHOD OF USE

FIELD OF THE INVENTION

The present invention relates to grease guns. Specifically, the present invention relates to a linear push-button attachment/detachment apparatus for connection, use, and removal of a grease reservoir from a complimentarily designed grease gun. Moreover, the present invention relates to a stepped-groove providing a plurality of grooves for a grease reservoir to interface with providing an optional safety mechanism from unwanted/unintentional releases of the reservoir from the grease gun.

BACKGROUND

Grease guns and grease reservoirs for delivery of grease from the guns are known in the art. Currently available systems use threads cut or formed into the outside diameters of an end of a grease reservoir, for example a grease barrel. These threads mate with threads cut or formed in the receiving bore of a grease gun head or body. In order for the grease barrel to properly mate with the receiving bore, the barrel must be rotated 360 degrees numerous times in order to compress a gasket against either an end of the receiving bore or an end of the barrel. The number of barrel rotations can range between as few as three times up to and including seven times. This repeated rotation leads to inefficiency caused by the amount of time involved, potential injury to the person rotating the barrel, and generally is an inconvenience to the user. Moreover, cross-threading of the barrel and receiving bore due to incorrect initial positioning by the user would result in an inoperable grease gun. In addition, due to the threads positioned in the receiving bore, it is not possible to use a radial seal to seal the grease barrel and the receiving bore of the grease gun. Current grease guns are limited to using axial or face seals which are compressed or squeezed between the grease gun and the top portion of the grease barrel.

Additionally, other quick release mechanisms use latches and mechanisms that still require the user to rotate the grease reservoir or provide rotational force to at least a portion of the grease gun. For example, U.S. Pat. No. 8,297,476 to Weems et al. (hereinafter the "'476 Patent") describes a quick connect mechanism that requires a user to rotate a handle along a portion of the grease gun head to expand a retention fastener to allow the loading or removal of a grease reservoir. Although this is more convenient and advantageous compared to grease guns that mate with reservoirs using complimentarily cut threading, it is still less than ideal for a user to hold the grease gun head in place while at the same time rotate the handle around a portion of the grease gun head while simultaneously inserting or removing the grease reservoir.

Moreover, other quick release mechanisms that utilize a bayonet style attachment mechanism are known in the art. However, traditional bayonet style attachment mechanisms require a user to insert a barrel and turn the barrel a quarter turn within the grease gun to latch into place. Furthermore, quick release mechanisms that utilize lever based latches are also known in the art. Traditional lever based latches include one or more latching members that interface with the grease reservoir and/or grooves that are spaced to accept and hold the latching members on the grease reservoir. These types of mechanisms also have their own disadvantages. For example, a lever based latch system that aids a user by increasing the torque applied to the grease reservoir mating end of the latch still converts the user's initial linear input into a rotational force to create the work necessary to move the latching members into or out of place to lock or unlock a grease reservoir, respectively. Additionally, lever based latch mechanisms are typically spring biased toward the closed position of the latch members to avoid unintended releases of the grease reservoir. These spring biases are more prone to failure and will fatigue over time, thereby lessening the retention bias of the grease gun utilizing such a mechanism. Moreover, given the relative weakness of a latch mechanism retention system, grease guns utilizing these mechanisms may not be able to be pressurized sufficiently and would not be able to be pressurized to the same level as the threaded grease reservoir designs or the aforementioned quick connect design disclosed by the '476 Patent.

Accordingly, an improved device and method of attaching, sealing and removing a grease reservoir from a grease gun is provided.

SUMMARY

A grease gun is disclosed having a body with a reservoir connection aperture. The reservoir connection aperture includes an inner portion, an outer portion and a plurality of concentric grooves positioned along the inner portion. A grease reservoir is in communication with the reservoir connection aperture and includes a groove in a portion of the outside surface of the grease reservoir. A retention fastener is removably received by at least one of the concentric grooves and is in operational engagement with the grease reservoir groove to removably retain the grease reservoir in the grease gun. The retention fastener is further connected to a retention bracket mounted on the outer surface of the reservoir connection aperture. The retention bracket may move within a first aperture of the reservoir connection aperture to allow for movement of the retention fastener. The retention bracket moves in response to force applied to a push-button on the outer surface of the grease gun through a deflecting beam connected to the push-button and retention bracket. Additionally, the push-button moves along a track, via one or more push-button track members.

A method of mounting a barrel to a grease gun is also provided. The method includes the steps of pushing a push-button on the outer surface of the grease gun, inserting the barrel into a barrel mount in the grease gun body, and engaging the snap ring or alternative retention fastener with a groove on the barrel and at least one of the plurality of concentric grooves by releasing the push-button, thereby preventing disengagement of the barrel from the grease gun.

DETAILED DESCRIPTION

The invention shown in the Figures is generally directed to a grease gun 100, and in particular a push-button quick-connect and disconnect attachment assembly 101 for connecting a grease reservoir to a barrel mount 120 of a grease gun 100. For ease of discussion and understanding, the following detailed description and illustrations refer to the quick connect attachment assembly 101 for use with grease and a grease barrel 130. It should be appreciated that "grease" is provided for purposes of illustration, and the quick connect assembly may be used in a variety of devices for a variety of substances, including, but not limited to, grease, oil, semisolid or emulsified lubricants, or other materials having a viscosity or rheological composition enabling semi-controlled conveyance. Further, it should be appreciated that a "grease barrel" is provided for purposes of illustration and the quick connect assembly may be used to connect a grease gun 100 with any type of grease reservoir, for example a reservoir, tank, or storage receptacle of any shape or size. Further, the grease reservoir may include any device or method suitable for transferring grease from the reservoir to the grease gun, including, but not limited to, direct connection or by extension, for example by a hose. For example, it is anticipated that the barrel 130 may be substituted with an adapter in communication with a hose. In accordance with the present invention, the adapter may include a groove or slot similar to barrel groove 132 for operational engagement with the attachment assembly 101. The hose may then be in communication with a grease reservoir, allowing for a remote-feed application.

Figure 1:
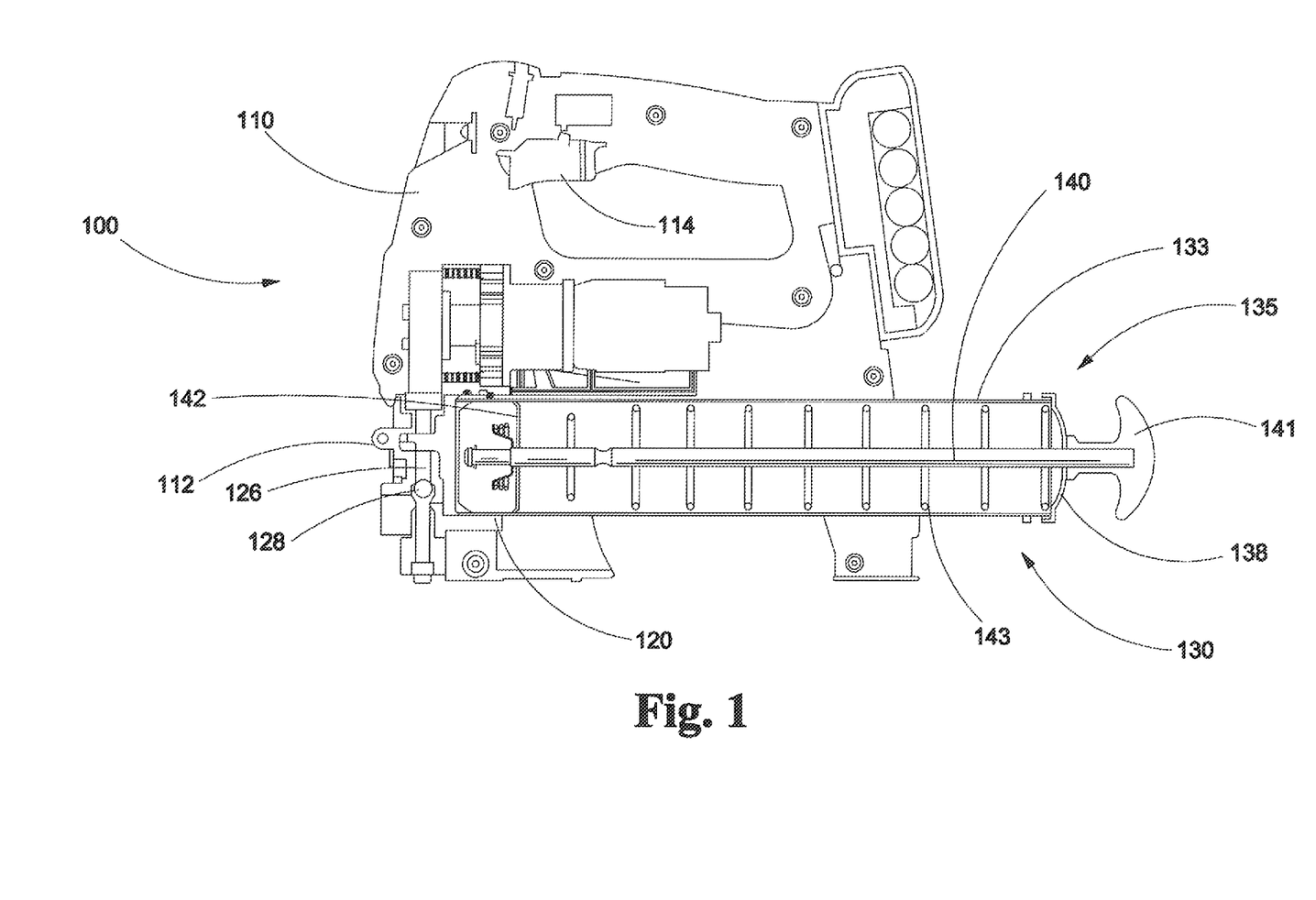
FIG. 1 is a side cross-sectional view of a grease gun with a barrel mounted therein as provided in the preferred embodiment of the present invention.

FIG. 1 illustrates a grease gun 100 in accordance with the preferred embodiment of the present invention. The grease gun 100 may include a grease gun body 110 and a grease reservoir, illustrated as a grease barrel 130. The grease barrel 130 may be removably connected to the grease gun body 110. The grease gun 100, the grease barrel 130 and the additional components described herein may be formed from die cast aluminum, injection molded plastic, composite material, or by any other known and suitable materials, processes or methods, whether now known or in the future. The grease gun body 110 may include a grease gun head 112. The grease gun head 112 may include a longitudinal bore through a portion of the grease gun head 112.

Operably received within the longitudinal bore may be a plunger or piston assembly 126. The piston assembly 126 may include a discharge end and may also be in communication with the inlet valve body 125 (see FIG. 6) of the receiving bore 122. The piston assembly 126 further may be in communication with a compression area which may pressurize grease within the grease gun body 110. Additionally, a volume adjustment or pressure adjustment or toggle lever may be operably connected to the piston assembly 126 to adjust volume or pressure of grease delivered by the grease gun 100 when a user activates the actuation mechanism 114. It should be appreciated by one skilled in the art that the grease gun 100 and grease gun body 110 may include alternate grease distribution actuation mechanisms, including, but not limited to, manual operation, air or pneumatic operation, battery power operation, or electric power operation.

Operably connected to the discharge end of the piston assembly 126 may be an outlet valve. The outlet valve may include a nozzle which may be removably connected to the discharge end of the piston assembly 126. The outlet body may also include an output check ball 128 biased by an output spring 127 (see FIG. 2).

As illustrated in FIG. 1, the grease gun 100 of the preferred embodiment may also provide a reservoir connection aperture or barrel mount 120. Specifically, the grease gun body 110 of the preferred embodiment may include a reservoir connection aperture or barrel mount 120. The barrel mount 120 may be integrally connected to the grease gun body 110 as a unitary assembly. The barrel mount 120 may include a recess or receiving bore 122 (see FIG. 6) sized to removably receive a reservoir or barrel 130. The inner portion of the receiving bore 122 may be sized to correspond and operably mate with a barrel 130, and specifically an outer diameter of the barrel 130. It is contemplated the receiving bore 122 may be of different shapes, sizes, diameters, lengths or heights to correspond with different sizes or types of reservoirs or barrels 130. In addition, it is further contemplated the barrel mount 120 receiving bore 122 may be provided with different depths to removably receive or engage with different lengths of a barrel 130. This may allow for varying depths of engagement between the receiving bore 122 and barrel 130 without departing from the scope of the present invention. Moreover, it is anticipated that the inner portion of the receiving bore 122 would closely approximate the outer diameter of the barrel 130 so they may seal or tightly engage.

Figure 2:
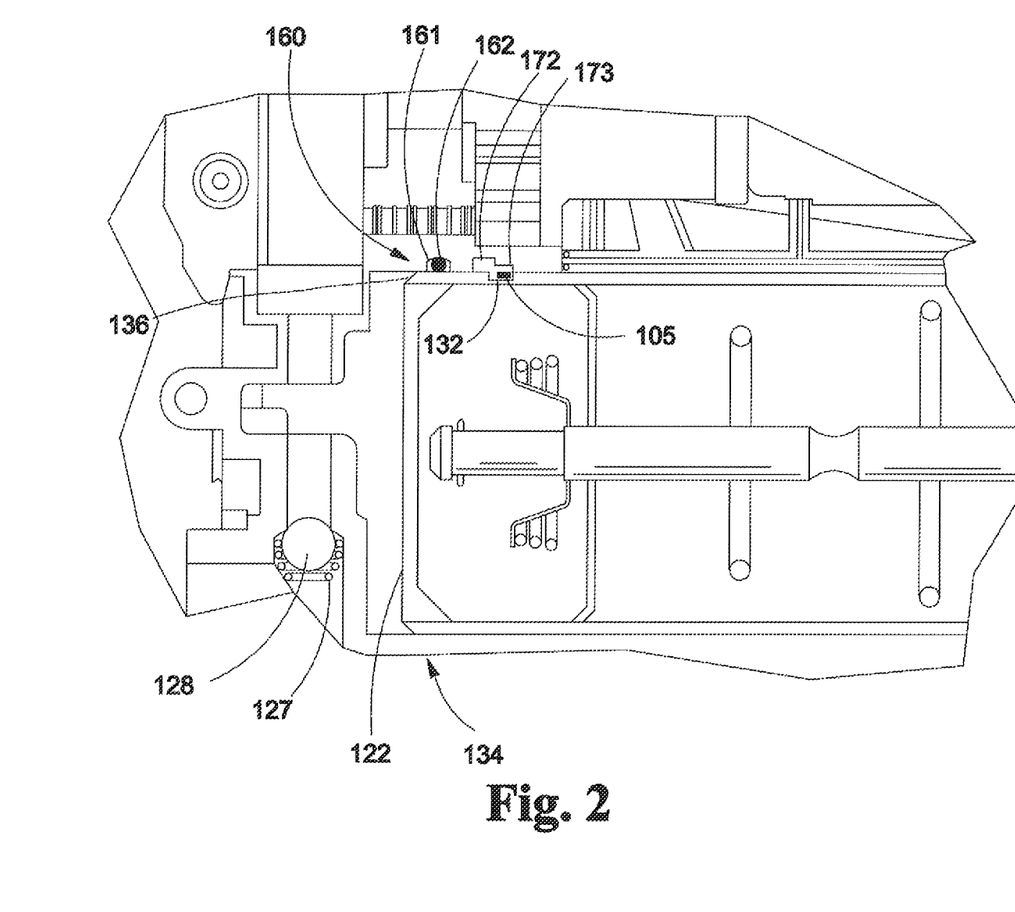
FIG. 2 is a partial side cross-sectional view of the grease gun with a barrel mounted therein as provided in the preferred embodiment of the present invention.

Referring to FIGS. 1 and 2, depicted is the grease barrel 130 of the preferred embodiment of the present invention. The barrel 130 may include a grease gun engaging end or first end 134 (see FIG. 2) and a second end 135. The barrel 130 may also include a barrel groove, slot, trench, or channel 132 positioned on the outer surface 133 of the barrel 130. The groove 132 may be a circumferential channel extending the entire outer surface of the barrel 130. However, it should be appreciated by one skilled in the art that any groove 132 of sufficient size, shape, and location to receive the retention fastener 105 may be utilized without departing from the scope of the present invention. The groove 132 may also be positioned to correspond with the location of the retention fastener 105 of the attachment assembly 101 in the receiving bore 122. Once positioned, the retention fastener 105 may securely engage with the groove 132, as shown in FIGS. 1 and 2. Additionally, the groove 132 may be provided in one or more segments, continuous or not continuous, on the outer surface 133 of the barrel 130. Further, it should be appreciated by one skilled in the art that the groove 132 may be of different depths, heights, sizes, and/or positions on the outer surface 133 of the barrel 130 to correspond with the size or position of the retention fastener 105, without departing from the scope of the present invention. Moreover, it is further contemplated the grease barrel 130 may be a reusable barrel which may be bulk loaded with grease or loaded with a disposable cartridge. Further, it should be appreciated by one skilled in the art that the grease barrel 130 may be generally cylindrical, tubular, or any other shape as well as any suitable size or arrangement to operably engage the barrel mount 120 without departing from the scope of the present invention.

As illustrated in FIG. 1, the barrel second end 135 may have a cap 138 which slidably receives a plunger. The plunger may be an automatically or manually operated plunger formed of a longitudinal rod 140 having a handle 141 on one end and a grease displacement member 142 at the other end. A spring, preloaded spring, or follower spring 143 may be provided surrounding the longitudinal rod 140 of the plunger and may be retained between the cap 138 and the grease displacement member 142. The spring 143, generally, may bias and force grease toward the first end 134 and away from the second end 135 of the barrel 130. It is contemplated the spring 143 of the plunger may also bias the barrel 130 away from the grease gun body 110 when attached. In other words, to attach the barrel 130, the spring 143 is compressed, at least slightly. Thus, the spring 143, which is used to push grease into the grease gun head 112, may also push the second end 135 of the barrel 130 away from the grease gun head 112. The resulting force pushes the retention fastener 105, which is engaged with the barrel groove 132 (see FIG. 2), into the lower snap ring groove 173 (see FIG. 2) and prevents the retention fastener 105 from expanding. This may prevent the barrel 130 from being ejected from the grease gun head 112 when the spring 143 forces grease into the grease gun head 112. Furthermore, as depicted in FIG. 2, the barrel 130 may also include a beveled upper surface 136 on the grease gun engaging end 134. The beveled upper surface 136 may assist in engaging the barrel 130 with the retention fastener 105 of the attachment assembly 101.

Referring again to FIG. 2, the barrel mount receiving bore 122 may include a sealing assembly or radial sealing assembly 160 to seal the connection between a portion of the barrel 130 and the inner portion of the barrel mount receiving bore 122. The seal may limit or eliminate unwanted discharge of grease from the barrel 130 and/or barrel mount 120 during operation of the grease gun 100. The sealing assembly 160 may include a sealing recess or groove 161 positioned along the circumference of the inner portion 123 of the receiving bore 122. The sealing assembly 160 may further include a sealing member 162. The sealing member 162 may be an annular or toroidal member, for example an O-ring, which may be removably received or set in the sealing recess 161. The sealing member 162 may be sized to be slightly larger than the sealing recess 161 and may be formed of a flexible material. This enables the sealing member 162, upon insertion of a barrel 130 into the receiving bore 122, to deform and radially compress against the outer surface 133 of the barrel 130. It should be appreciated by one skilled in the art that the sealing assembly 160 may be positioned at any point along the inner portion of the barrel mount receiving bore 122 without departing from the scope of the present invention. Further, it should be appreciated by one skilled in the art that the sealing member 162 may be semi-permanently or permanently received in the sealing recess 161 without departing from the scope of the present invention. Moreover, it is contemplated the sealing member 162 may be formed of silicone, urethane, TEFLON®, Nitrile or Buna-N, or other natural or synthetic material suitable for sealing. However, it should be appreciated by one skilled in the art that the sealing member 162 may be made of any suitable sealing material without departing from the scope of the present invention.

Figure 7:
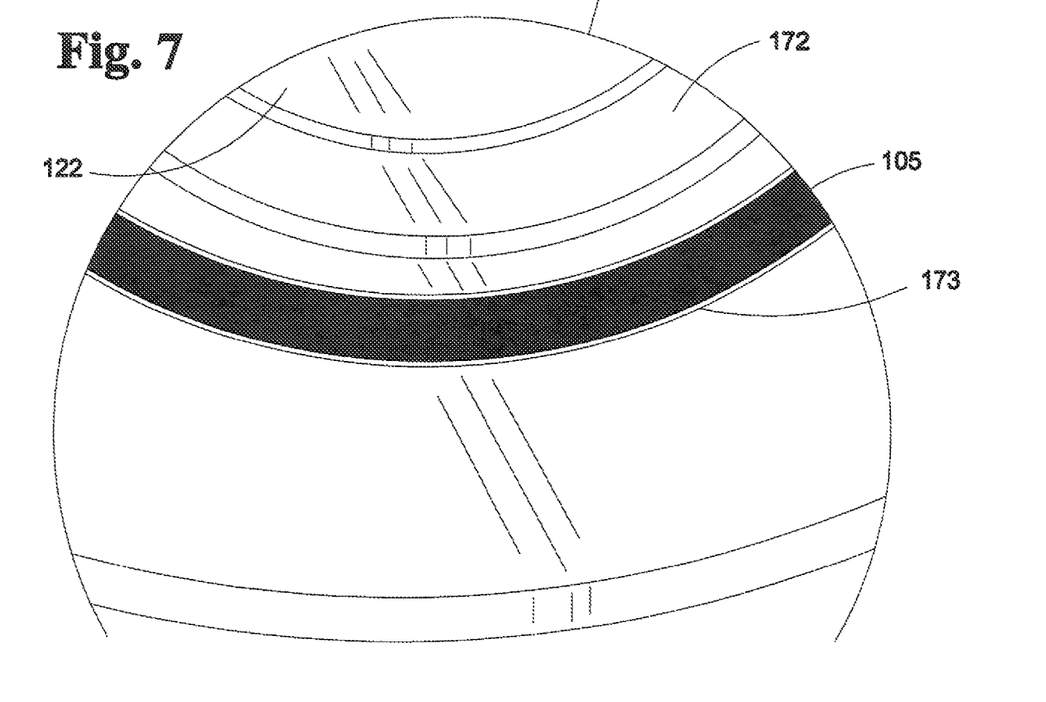
FIG. 7 is a close-up view of the interior of the grease gun barrel mount as provided in the preferred embodiment of the present invention.

As further provided in FIG. 7, the attachment assembly 101 (see FIG. 4) may include one or more concentric grooves, slots, or trenches. The concentric grooves may be positioned along the circumference of the inner portion of the receiving bore 122. The concentric grooves may include an upper channel or upper snap ring groove or first groove 172 and a lower channel or lower snap ring groove or second groove 173. The upper and lower snap ring grooves 172, 173 may be arranged in operational alignment, namely the retention fastener 105 may adjust, slide, or move between the snap ring grooves 172, 173. As illustrated, the upper snap ring groove 172 is positioned adjacent and above the lower snap ring groove 173. The upper snap ring groove 172 may have a deeper recess from the inner portion of the receiving bore 122 compared to the lower snap ring groove 173. Accordingly, the upper snap ring groove 172 may have a larger diameter than the lower snap ring groove 173. However, it should be appreciated by one skilled in the art that any location, arrangement, size, shape, and/or depth of the snap ring grooves 172, 173 that are of sufficient complimentary design to accept and removably retain the retention fastener 105 may be utilized without departing from the scope of the present invention. Additionally, it should be appreciated by one skilled in the art that any number of grooves may be utilized without departing from the scope of the present invention.

Figure 6:
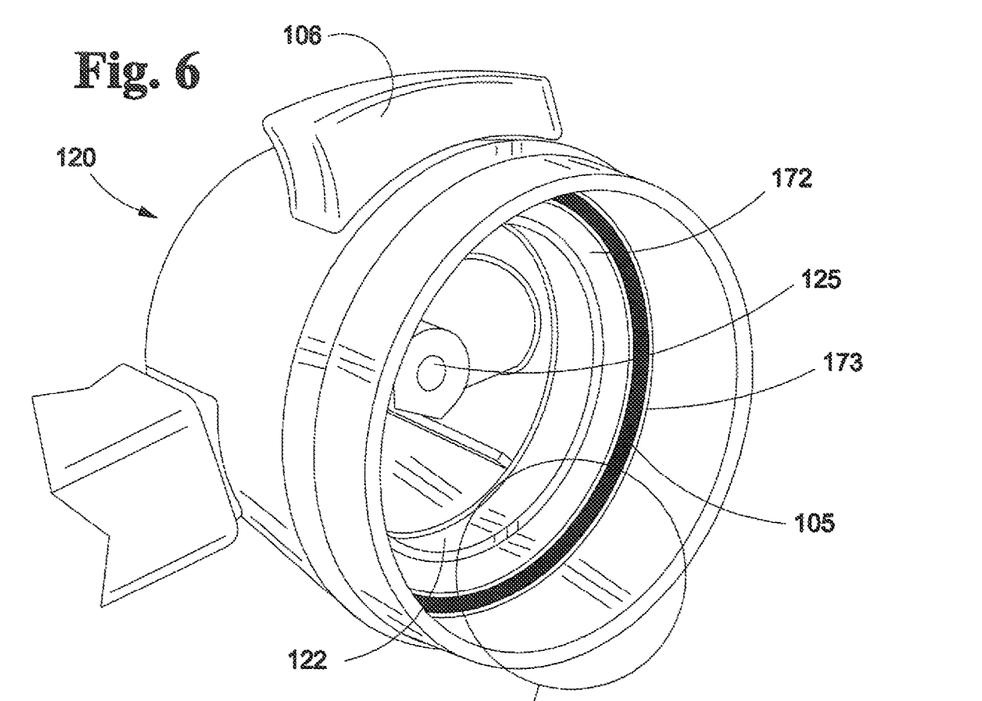
FIG. 6 is a bottom perspective view of the grease gun barrel mount as provided in the preferred embodiment of the present invention.

Looking back to FIG. 6, the attachment assembly 101 may include a retention fastener 105. The retention fastener 105 of the preferred embodiment may be a snap ring. It should be appreciated by one skilled in the art that any type, shape, or size retention fastener 105 may be utilized to surround at least a portion of a barrel 130 without departing from the scope of the present invention. Additionally, it is contemplated the retention fastener 105 may be any suitable type of fastener or retaining ring consisting of a semi-flexible material which may include open ends and which can be snapped into place, for example into a groove, to permit rotation but to prevent lateral movement. The retention fastener 105 of the preferred embodiment may be generally curved or arcuate in shape. However, it should be appreciated by one skilled in the art that any shape sufficient to removably retain the barrel 130 may be utilized for the retention fastener 105 without departing from the scope of the present invention.

The retention fastener 105 may be removably received by the attachment assembly 101. As illustrated in FIGS. 6 and 7, the retention fastener 105 may be engaged or retained in the snap ring grooves 172, 173. The retention fastener 105 may be biased inward and may have a natural or free state such that the inner diameter may be slightly narrower or smaller than the outer diameter of the barrel 130. In this regard, the retention fastener 105 may be biased or have a free state such that the outer diameter may fit or be retained with a portion of the concentric grooves, illustrated as the lower snap ring groove 173. When the barrel 130 is inserted into the barrel mount 120, the barrel 130 will apply force against the bias of the retention fastener 105, urging the retention fastener 105 into the lower snap ring groove 173 to prevent unwanted removal of the barrel 130.

Further, it is contemplated the retention fastener 105 may be adapted to be mounted or retained on the barrel 130. In this alternative arrangement, the retention fastener 105 may have a bias outward and a natural or free state that is slightly larger than the inner portion of the barrel mount 120. Accordingly, the retention fastener 105 would have a bias toward interfacing with one or more of the concentric grooves provided in the barrel mount 120 of the grease gun 100. The attachment assembly 101 may be adapted to receive or engage a retention fastener 105 according to this arrangement. Specifically, the retention fastener 105 would compress inward upon force exerted against the push-button 102 of the attachment assembly 101 via one or more connection mechanisms such as the deflecting beam or pin joint 107 as discussed below. However, it should be appreciated by one skilled in the art that any arrangement and/or mechanism of interfacing the attachment assembly 101 with the barrel 130 retained retention fastener 105 to provide the necessary force to disengage the retention fastener 105 from the concentric groove of the barrel mount 120 of the grease gun 100 may be utilized without departing from the scope of the present invention. Furthermore, it should be appreciated by one skilled in the art that any form of altering the shape of the barrel 130 mounted retention fastener 105 to disengage or engage the barrel 130 with the barrel mount 120 of the grease gun 100 may be utilized without departing from the scope of the present invention.

Figure 3:
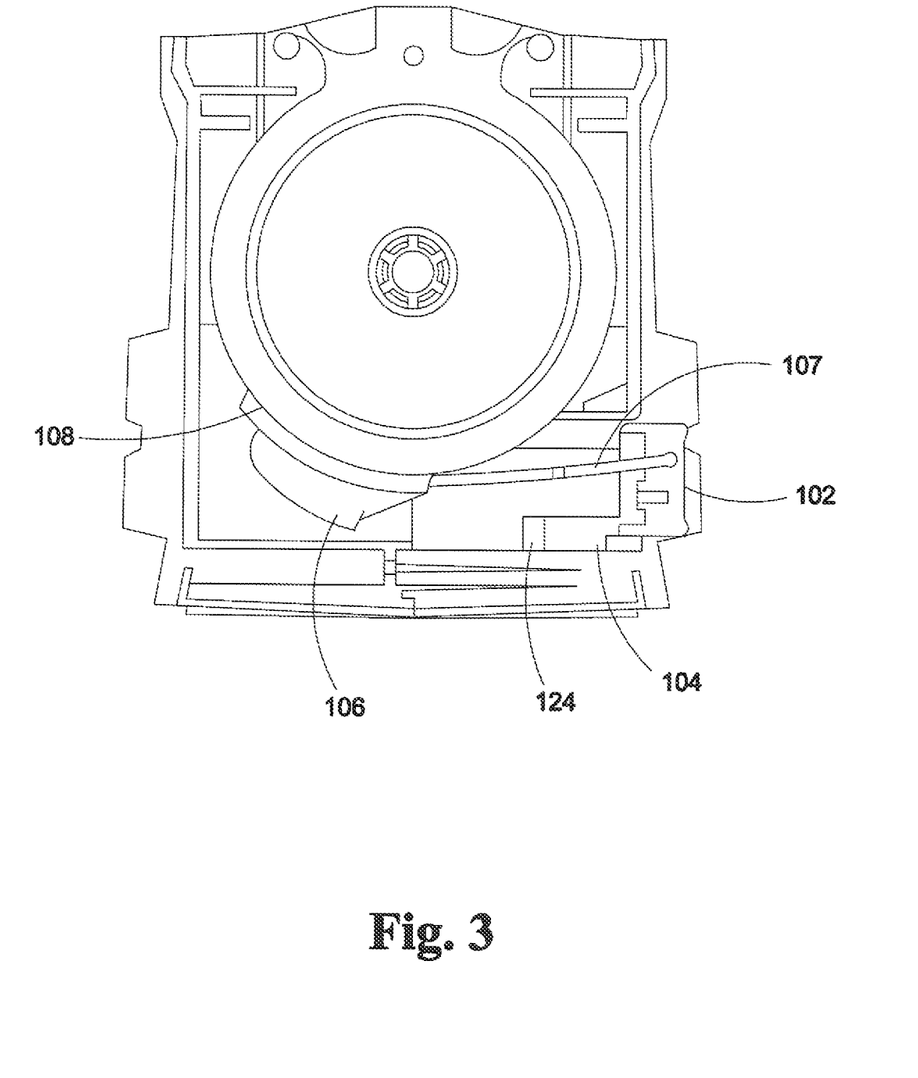
FIG. 3 is a top cross-sectional view of the grease gun as provided in the preferred embodiment of the present invention.

Looking back to FIG. 3, provided is the outer portion of the attachment assembly 101. The outer portion of the attachment assembly 101 may be permanently, semi-permanently, or removably attached to the retention fastener 105. The outer portion of the attachment assembly 101 may include a push-button 102 that allows a user to exert linear force on the attachment assembly 101. The push-button 102 may be movably retained within the grease gun body 110 by interfacing the push-button track members 104 with a corresponding push-button track 124 within the barrel mount 120 of the grease gun body 110. It should be appreciated by one skilled in the art that the push-button 102 may be located anywhere on the exterior of the grease gun body 110 without departing from the scope of the present invention. The push-button 102 may also interface with a deflecting beam 107 connected to the retention fastener bracket 106 of the attachment assembly 101 of the preferred embodiment. The deflecting beam 107 may transfer the user-exerted force on the push-button 102 to the bracket 106 which may, in turn, move along a first aperture 108 of the attachment assembly 101. Movement of the bracket 106 along the first aperture 108 may deform the connected retention fastener 105 out of its biased, natural, or free state to allow for the insertion or removal of the barrel 130 from the barrel mount 120. Accordingly, the aperture 108 of the attachment assembly 101 may be of any size, length, or arrangement suitable for engaging the retention fastener 105 to provide resistance during deformation or adjustment of the retention fastener 105.

It is further contemplated alternative connecting mechanisms may be utilized in the attachment assembly 101 to achieve the same effect as the deflecting beam 107 of the preferred embodiment. Specifically, a pin joint may be utilized in place of the deflecting beam 107 where the pin or the joint may be located on bracket 106 or push-button 102 and the created hinge may close as force is exerted on the push-button 102 causing the connected bracket 106 to move along the aperture 108. Alternatively, a ball and socket joint or cam and roller/slider joint may replace the deflecting beam 107. Similar to the pin joint, a ball and socket joint may mount the ball with rod or socket to the bracket 106 or the push-button 102. When force is applied to the push-button 102 the ball and socket joint closes and causes the connected bracket 106 to move along the aperture 108. Similarly, the cam and roller/slider joint contemplates a portion of the button 102 or bracket 106 may slide or roll along the bracket 106 or button 102, respectively, thereby causing the connected bracket 106 to move along the aperture 108. In any case, it should be appreciated by one skilled in the art that any of the above described connection mechanisms or any other now know or future contemplated mechanism or combination of connection mechanisms may be utilized without departing from the scope of the present invention.

Figure 4:
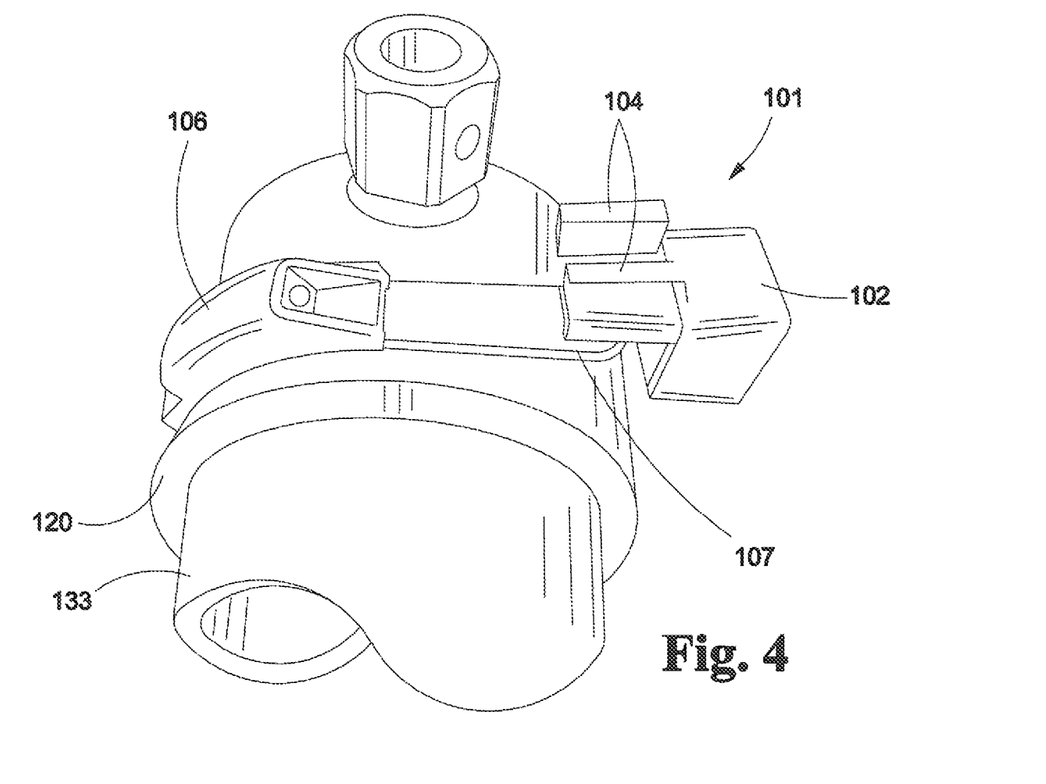
FIG. 4 is a partial perspective view of the grease gun barrel mount with a barrel mounted therein as provided in the preferred embodiment of the present invention.
Figure 5:
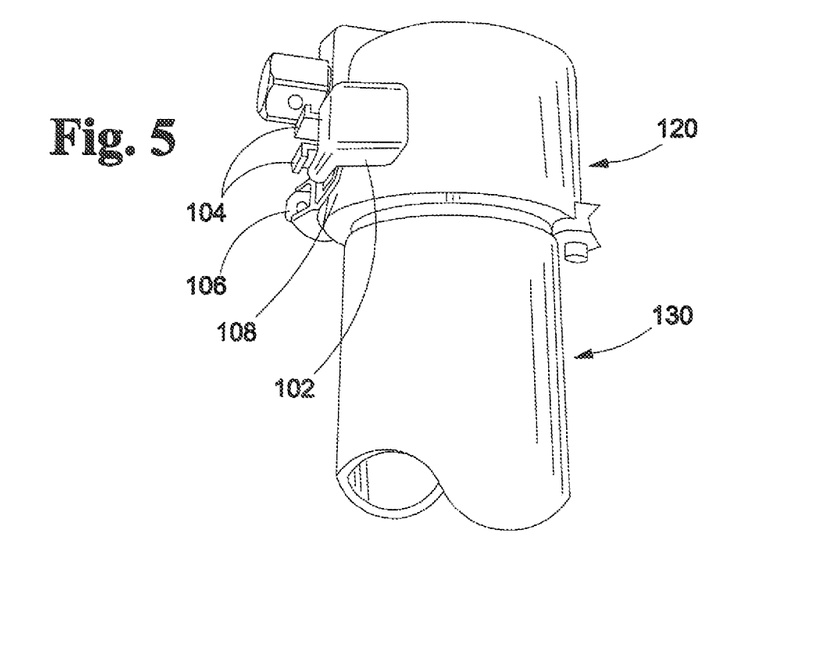
FIG. 5 is a side perspective view of the grease gun barrel mount with a barrel mounted therein as provided in the preferred embodiment of the present invention.

As depicted in FIGS. 4 and 5, when positioned in the attachment assembly 101, the retention fastener 105 may retain the barrel 130 axially in the receiving bore 122 of the barrel mount 120. Moreover, as discussed above, the retention fastener 105 has a shape to surround a portion of the barrel 130. Further, the retention fastener 105 may be sized to provide an interference fit or slip fit onto a barrel groove or slot or trench 132 provided on the outer diameter 131 of the barrel 130. The resulting operational engagement or engagement of the retention fastener 105 with the barrel groove 132 results in the barrel 130 being held in place in the barrel mount 120. FIG. 4 further illustrates the preferred embodiment of the push-button track members 104 as well as the connection between the button 102 and bracket 106 via the deflecting beam 107. Additionally, as illustrated in FIG. 5, the outer portion of the attachment assembly 101, namely, the button 102, track members 104, bracket 106, deflecting beam 107, and aperture 108 are mounted on or within the barrel mount 120.

In operation and use, engagement and disengagement of the barrel 130 from the grease gun body 110 may be accomplished by actuation of the retention fastener 105. In the preferred embodiment of the present invention, the retention fastener 105 may be removably received by the attachment assembly 101, may be biased inward, and may have a natural or resting state with an inner diameter smaller than the outer diameter of the barrel 130 and an outer diameter corresponding to or smaller than the diameter formed by the lower snap ring groove 173. FIGS. 1 and 2 illustrate the preferred embodiment of the barrel mount 120 for a grease gun 100, in which the attachment assembly 101, and, in particular, the retention fastener 105, is provided in the engaged position with a barrel 130. The push-button 102 of the attachment assembly 101, connected to the retention fastener 105 may be moved linearly within the push-button track 124 of the barrel mount 120 to increase the diameter of the retention fastener 105. The barrel 130 may then be received within the receiving bore 122 of the barrel mount 120 in the grease gun head 112. By releasing the push-button 102, the retention fastener 105 biases inward, thereby tightening around the barrel 130. The barrel 130 may then be adjusted upward or downward to engage the retention fastener 105 with the barrel groove 132. The barrel 130 follower spring 143 then biases the barrel 130 away from the grease gun body 110 when the barrel 130 contains grease to be dispensed, effectively pushing the retention fastener 105 into a space formed by the lower snap ring groove 173 and corresponding barrel groove 132. The retention fastener 105 is in a contracted state forming an interference fit with the barrel 130, thereby preventing removal of the barrel 130 from the receiving bore 122. In the engaged position, the retention fastener 105 is in contact with the barrel groove 132 and a portion of the lower snap ring groove 173, but rests against the inner wall of the barrel groove 132 (see FIG. 2).

However, it is contemplated the barrel mount 120 may be engaged with a barrel 130 without manual actuation of the push-button 102 of the attachment assembly 101. A user may press the barrel 130, and specifically the grease gun engaging end 134, into the receiving bore 122 of the barrel mount 120. The retention fastener 105 may receive the beveled upper surface 136, moving along the top portion of the receiving bore 122, concurrently expanding outward or increasing in diameter until reaching the barrel groove 132. Upon reaching the barrel groove 132, the retention fastener 105 may then move toward its resting state in the barrel groove 132. The retention fastener 105 is engaging both the barrel groove 132 and concentric grooves of the attachment assembly 101, preventing disengagement of the barrel 130 from the grease gun 100. As a result, the retention fastener 105 does not need to be manually moved or actuated by a user to engage the barrel 130 with the grease gun 100 during insertion into the barrel mount 120 receiving bore 122 of the grease gun body 110.

Furthermore, as illustrated in FIGS. 1, 2, 6, and 7, the preferred embodiment of the grease gun 100 may include a stepped arrangement of grooves within the attachment assembly 101 to provide a locking mechanism for the retention fastener 105. In particular the retention fastener 105, is provided in the locked position with the barrel 130. The locked position may prevent accidental disengagement of the barrel 130 from the barrel mount 120 upon inadvertent or accidental actuation of the retention fastener 105, for example, but not limited to, inadvertent actuation of the button 102 by a user or contact with an external surface or object. In the locked position, the retention fastener 105 is arranged between the contracted position of the engaged state and the expanded position of the disengaged state. To this end, the retention fastener 105 is in contact with the lower snap ring groove 173 and a portion of the barrel groove 132, but rests against the outer wall of the lower snap ring groove 173 (see FIG. 2).

Disengagement of the retention fastener 105 permits quick and efficient removal of the barrel 130 from the grease gun body 110. The button 102 of the attachment assembly 101 connected to the retention fastener 105 via the deflecting beam 107 and bracket 106 through the aperture 108, may be moved within the first aperture 108 and against the bias to increase the diameter of the retention fastener 105. Concurrently, the retention fastener 105 shifts concentric grooves. Specifically, the retention fastener 105 moves from the lower snap ring groove 173 to the upper snap ring groove 172, while maintaining contact with the barrel groove 132. As contemplated with the optional safety mechanism, to move the button 102 and expand the diameter of the retention fastener 105, the application of force on the barrel 130 toward the bore 122 of the barrel mount 120 may be necessary. The application of force may facilitate the shift of the retention fastener 105 from the lower snap ring groove 173 to the upper snap ring groove 172. Once aligned with the upper snap ring groove 172, the button 102 may be further actuated, increasing the diameter of the retention fastener 105 until the fastener 105 is received by the upper snap ring groove 172. Concurrently, the retention fastener 105 is withdrawn from the barrel groove 132, disengaging the retention fastener 105 from the barrel 130. The barrel 130 is now free to be removed from the barrel mount 120. Once removed, a barrel 130 may then be inserted into the barrel mount 120. Upon insertion of the barrel 130, the push-button 102 may be manually actuated or automatically moved as described above, resulting in returning the retention fastener 105 to the engaged position.

Figure 8:
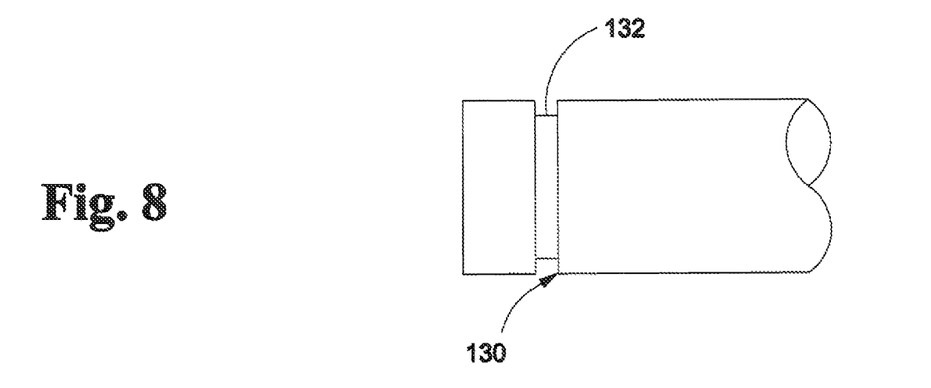
FIG. 8 is a side elevation view of a first alternative embodiment of the grease gun barrel of the present invention.
Figure 8A:
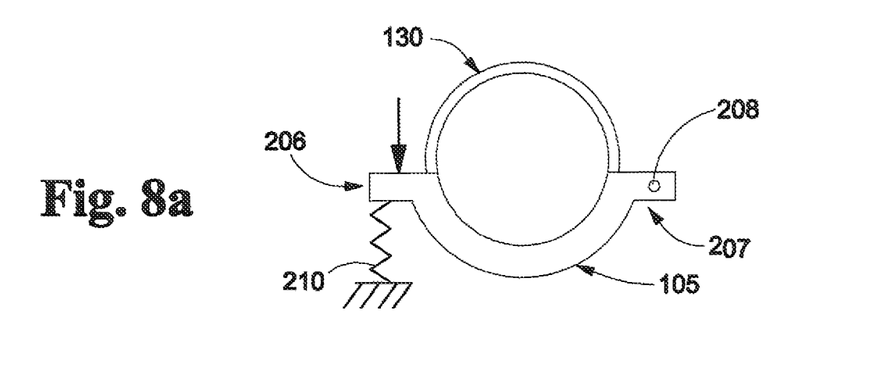
FIG. 8A is a top perspective view of the first alternative embodiment of the grease gun barrel mount with a locked barrel removably attached thereto of the present invention.
Figure 8B:
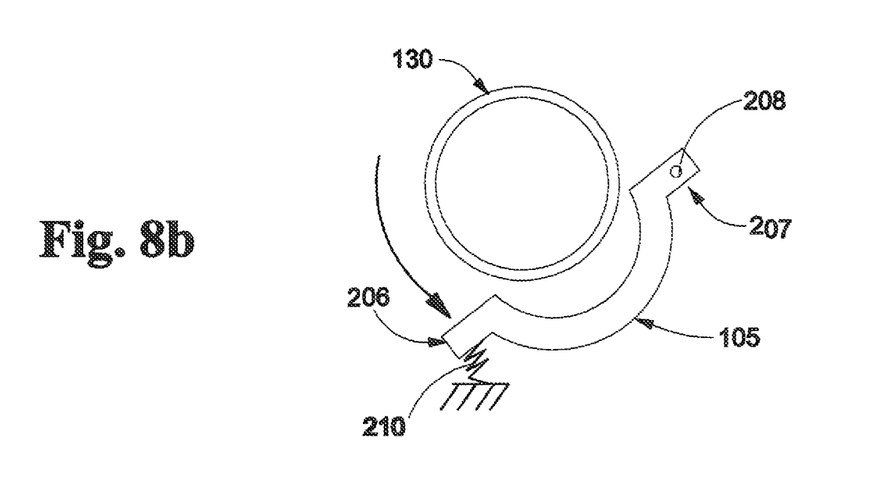
FIG. 8B is a top perspective view of the first alternative embodiment of the grease gun barrel mount with an unlocked barrel removably attached thereto of the present invention.

Also provided, are two alternative embodiments of the present invention. Specifically, as illustrated in FIGS. 8-8B, provided is a first alternative embodiment where it is contemplated the snap ring retention fastener 105 of the preferred embodiment is replaced with a lock lever retention fastener 105. As provided in FIG. 8, the lock lever 105 interfaces with the barrel groove 132 of the barrel 130 of the preferred embodiment as discussed above. As depicted in FIGS. 8A and 8B, the lock lever 105 is contemplated as pinned to the grease gun body 110, specifically within the interior of the barrel mount 120 via one or more pins 208. However, it should be appreciated by one skilled in the art that the lock lever 105 may be located in any arrangement to removably interface with the barrel groove 132 without departing from the scope of the present invention. The pinned side 207 of the lock lever 105 produces a fulcrum on which the lever 105 may pivot. Specifically, the lock lever 105 will pivot in response to force from the push-button 102 of the attachment assembly 101.

It is contemplated the lock lever 105 is biased toward the interior of the barrel mount 120, in other words, toward interfacing with the barrel groove 132. It is contemplated the bias is achieved using a lock lever spring 210 as provided in FIGS. 8A and 8B. However, it should be appreciated by one skilled in the art that the lock lever 105 may be biased toward the exterior of the barrel mount 120 or away from the barrel groove 132 if mounted to the barrel 130 without departing from the scope of the present invention. As with the preferred embodiment described above, the lock lever 105 is movably connected to the attachment assembly 101 wherein force applied to the push-button 102 of the attachment assembly 101 translates to force applied to the non-pinned end 206 of the lock lever 105 against the spring bias provided by the lock lever spring 210. However, it should be appreciated by one skilled in the art the force applied to the push-button 102 may be translated to any type or form of force necessary to provide the desired movement of the lock lever 105 without departing from the scope of the present invention. As provided in FIG. 8B, upon force applied to the non-pinned end 206 of the lock lever 105 through the push-button 102, the lock lever 105 disengages from the barrel groove 132. A user may then remove the barrel 130 from the barrel mount 120 of the grease gun 100.

Figure 9:
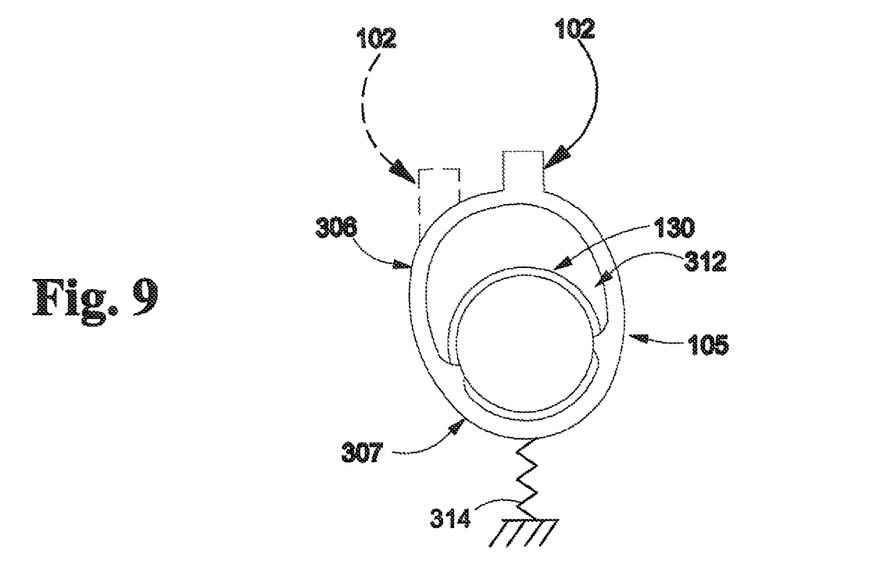
FIG. 9 is a top perspective view of a second alternative embodiment of the grease gun barrel mount with a locked barrel removably attached thereto of the present invention.
Figure 9A:
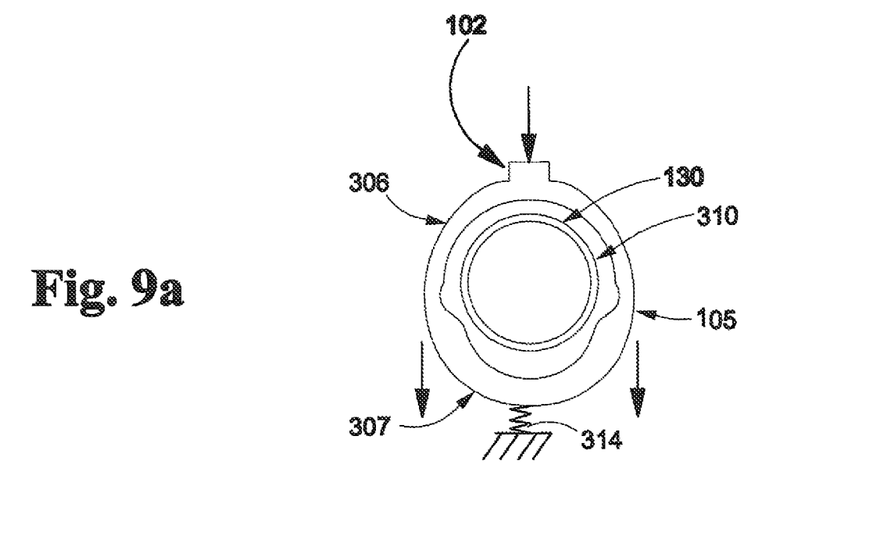
FIG. 9A is a top perspective view of the second alternative embodiment of the grease gun barrel mount with an unlocked barrel removably attached thereto of the present invention.

Additionally, as illustrated in FIGS. 9 and 9A, provided is a second alternative embodiment of the present invention. As depicted in FIG. 9, the retention fastener 105 of the second alternative embodiment is contemplated as a lock plate. The lock plate 105 interfaces with the barrel groove 132 of the barrel 130 of the preferred embodiment as discussed above. The lock plate 105 is contemplated as movably connected with the grease gun body 110 on at least the first or second end 306, 307 of the lock plate 105, specifically within the interior of the barrel mount 120. However, it should be appreciated by one skilled in the art that the lock plate 105 may be located in any arrangement to removably interface with the barrel groove 132 without departing from the scope of the present invention. The lock plate 105 of the second alternative embodiment utilizes two sized openings a first opening 310 and a second opening 312. It is contemplated the first opening 310 is larger than the second opening 312. The second opening 312 is small enough to removably interface with the barrel groove 132 and retain the barrel 130. The first opening 310 is larger than the diameter of the barrel 130 thereby allowing a user to remove a barrel 130 from the barrel mount 120 of the grease gun 100 of the present invention when the lock plate 105 is moved to the first opening 310 position. However, it should be appreciated by one skilled in the art that any number, size, and/or arrangement of openings may be utilized in conjunction with the lock plate 105 without departing from the scope of the present invention.

The lock plate 105 interfaces with the push-button 102 of the attachment assembly 101 similar to the preferred embodiment. Additionally, as depicted in FIGS. 9 and 9A, the lock plate 105 of the second alternative embodiment is biased toward the interior of the barrel mount 120 or towards the second opening 312 position by utilizing a lock plate biasing spring 314. However, it should be appreciated by one skilled in the art that the lock plate 105 may be biased in any direction necessary to retain the barrel 130 through any type of lock plate biasing member 314 without departing from the scope of the present invention.

As with the preferred embodiment described above, the lock plate 105 is movably connected to the attachment assembly 101 wherein force applied to the push-button 102 of the attachment assembly 101 translates to force applied to the lock plate 105 against the spring bias provided by the lock plate spring 314. However, it should be appreciated by one skilled in the art the force applied to the push-button 102 may be translated to any type of force necessary to provide the desired movement of the lock plate 105 without departing from the scope of the present invention. As provided in FIG. 9A, upon force applied to the lock plate 105 through the push-button 102, the lock plate moves from the second opening 312 position to the first opening 310 position which releases the barrel groove 132. It is contemplated the lock plate 105 moves linearly along complimentary channels or tracks within the grease gun body 110. However, it should be appreciated by one skilled in the art that any type of movement and/or movement mechanism may be utilized for the lock plate 105 without departing from the scope of the present invention. Once the lock plate 105 is moved to the first opening 310 position, a user may then remove the barrel 130 from the barrel mount 120 of the grease gun 100.

The foregoing embodiments provide advantages over currently available devices. In particular, the push-button quick connect and disconnect attachment assembly and associated features described herein decrease the amount of effort and time involved in installing or removing a barrel from a grease gun. This decrease in effort and time leads to increased efficiency, as time used for operation is not spent on engagement and disengagement of a barrel. Further, the attachment assembly allows for a user to easily engage and disengage a barrel. Engagement and disengagement of the barrel from the grease gun does not require the need for tools. In addition, the assembly decreases risk of injury to a user, as there is no rotation required to install a barrel and the assembly ensures safe securement of the barrel in the grease gun to guard against accidental or inadvertent removal. Additionally, the assembly allows for an improved sealing assembly enabling a radial seal between a portion of the outer surface of the grease barrel and a portion of the grease gun barrel mount.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings as will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

The invention claimed is:

1. A grease gun comprising:
 a user-operable push-button movably connected to a retention fastener via a connection mechanism;
 a locking mechanism to removably mount a grease reservoir, said locking mechanism including said retention fastener and said connection mechanism; and
 a body having a reservoir connection aperture including a plurality of body concentric grooves disposed to receive said retention fastener positioned along the inner portion of the reservoir connection aperture; and
 wherein applying linear force to the push-button disengages the locking mechanism to removably mount or dismount the grease reservoir.

2. The grease gun of claim 1, further comprising:
 a retention bracket;

said connection mechanism is a deflecting beam; and a grease reservoir in communication with the reservoir connection aperture, the grease reservoir having a groove in a portion of an outside surface of the grease reservoir complimentary to at least one of the body concentric grooves;

wherein the locking mechanism further comprises the plurality of body concentric grooves and said retention bracket.

3. The grease reservoir of claim 2, wherein the push-button is moveably connected to the retention fastener by interfacing with the retention bracket and at least one connection mechanism.

4. The grease gun of claim 3, wherein the retention fastener and the retention bracket are connected through a first opening and a second opening.

5. The grease gun of claim 2, wherein the body concentric grooves comprise an upper channel and a lower channel, the upper and lower channels in operational alignment.

6. The grease gun of claim 5, wherein the upper channel has a greater diameter than the lower channel and the retention fastener engages the lower channel to retain the grease reservoir.

7. The grease gun of claim 6, wherein the retention fastener engages the upper channel to enable adjustment of the retention fastener to disengage with the grease reservoir groove.

8. The grease gun of claim 7, wherein the retention fastener engages the upper channel upon inward force applied to the push-button and bottom of the grease reservoir simultaneously.

9. The grease gun of claim 2, wherein the retention fastener is a snap ring.

10. The grease gun of claim 9, wherein the snap ring has an inward bias.

11. The grease gun of claim 1, wherein the connection mechanism is selected from the group consisting of:
 a. a deflection beam;
 b. a pin joint;
 c. a ball and socket joint;
 d. a cam and roller joint;
 e. a cam and slider joint; and
 f combinations thereof.

12. The grease gun of claim 1, wherein the grease reservoir is a grease barrel.

13. A grease gun comprising:
 a body having a reservoir connection aperture including a plurality of body concentric grooves positioned along an inner portion of said reservoir connection aperture, said body concentric grooves disposed to receive a retention fastener;
 a grease reservoir in communication with the reservoir connection aperture, the grease reservoir having a groove in a portion of an outside surface of the grease reservoir;
 said retention fastener removably received by at least one body concentric groove and in operational engagement with the groove to removably retain the grease reservoir in the grease gun; and
 a user-operable push-button movably connected to said retention fastener via a connection mechanism and configured to actuate said retention fastener upon linear movement, such that said grease reservoir may be engaged or removed.

14. The grease gun of claim 13 wherein the connection mechanism is selected from the group consisting of:
 a. a deflection beam;
 b. a pin joint;
 c. a ball and socket joint;
 d. a cam and roller joint;
 e. a cam and slider joint; and
 f combinations thereof.

15. The grease gun of claim 14 further comprising a retention bracket and wherein the retention bracket is configured to move in response to force applied to said push-button through said connection mechanism.

* * * * *